United States Patent
Watanabe et al.

(10) Patent No.: US 7,611,655 B2
(45) Date of Patent: Nov. 3, 2009

(54) MOLDING METAL MOLD AND METHOD FOR PRODUCING A MOLDED ITEM

(75) Inventors: Seiichi Watanabe, Kanagawa (JP); Keiji Shigesada, Kanagawa (JP); Tatsuhiko Saeki, Kanagawa (JP); Kazutoshi Misonoo, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 291 days.

(21) Appl. No.: 11/441,090

(22) Filed: May 26, 2006

(65) Prior Publication Data
US 2006/0269647 A1    Nov. 30, 2006

(30) Foreign Application Priority Data
May 26, 2005   (JP)   ............... 2005-153374

(51) Int. Cl.
B29C 45/26    (2006.01)
B29C 43/36    (2006.01)
(52) U.S. Cl. ............... 264/337; 425/451.9; 425/595
(58) Field of Classification Search ............. 425/408, 425/334, 190, 547, 595, 412, 451.9; 249/184; 264/337
See application file for complete search history.

(56) References Cited

U.S. PATENT DOCUMENTS

| | | | | | |
|---|---|---|---|---|---|
| 3,555,606 | A | * | 1/1971 | Hedgewick | 425/556 |
| 3,575,233 | A | * | 4/1971 | Mahle et al. | 164/312 |
| 3,679,345 | A | * | 7/1972 | Malutich | 425/406 |
| 4,107,257 | A | * | 8/1978 | Swin, Sr. | 264/275 |
| 4,121,896 | A | * | 10/1978 | Shepherd | 425/412 |
| 5,368,469 | A | * | 11/1994 | Ekkert | 425/556 |
| 5,587,189 | A | * | 12/1996 | Niimi | 425/577 |
| 7,175,413 | B1 | * | 2/2007 | Graham | 425/441 |
| 2004/0170717 | A1 | * | 9/2004 | Satoh et al. | 425/116 |
| 2005/0127565 | A1 | * | 6/2005 | Wilson et al. | 264/275 |

FOREIGN PATENT DOCUMENTS

| | | | |
|---|---|---|---|
| JP | 62117717 | * | 5/1987 |
| JP | 408066745 | * | 3/1996 |
| JP | 2002-225086 A | | 8/2002 |
| JP | 2004034548 | * | 2/2004 |

* cited by examiner

*Primary Examiner*—Yogendra Gupta
*Assistant Examiner*—Emmanuel S Luk
(74) *Attorney, Agent, or Firm*—Sughrue Mion, PLLC (57) ABSTRACT

The present invention aims to allow production of a molded item having a highly precise shape. A molding metal mold is provided having a movable metal mold (first metal mold) and a fixed metal mold (second metal mold) defining a cavity therebetween in which a molded item is produced. The movable metal mold has a first convex taper tapering toward the fixed metal mold. The fixed metal mold has a first concave taper fittable with the first convex taper. The first convex taper and the first concave taper are arranged so that, when fitted to each other, respective taper surface abut to each other first, and then a clamping force of the movable metal mold and the fixed metal mold causes an abutting between an end surface and a bottom surface which are respective parting surfaces of the movable metal mold and the fixed metal mold around the cavity. The molding metal mold is used to produce a molded item by means of injection molding, for example.

19 Claims, 5 Drawing Sheets

MOLDING METAL MOLD AND METHOD FOR PRODUCING A MOLDED ITEM

BACKGROUND OF THE INVENTION

1. Field of the Invention

The present invention relates to a molding metal mold, and more particularly, to a molding metal mold capable of improving the precision of the shape of the molded item.

2. Description of the Related Art

In general, in production of molded items having the same shape, methods are used such as pouring into a molding metal mold a material such as melted resin, and pressing a material in the molding metal mold. The molding metal mold is provided inside with a cavity having concavities and convexities reversed to those of the molded items to reflect the shape thereof. To pour the material into the cavity, the molding metal mold is separated into two or more portions at a parting surface passing through the cavity.

Although the separate metal molds each have a positioning structure for positioning with a counterpart mold, when the positioning is conducted simply by fitting a pin into a hole, it is necessary to clearance-fit the pin to the hole to smoothly close and open the mold. This clearance causes a disparity between the cavity surfaces of one and the other molds, resulting in an error in the shape of the molded items.

To counter this problem, a technique is proposed to accurately align the separated molds by fitting convex and concave tapers to eliminate the clearance, instead of by a positioning with simple use of a pin and a hole, as disclosed in Kokai (Japanese Unexamined Patent Publication) No. 2002-225086, for example.

To fit the convex and concave tapers to each other, a technique is employed to abut the both taper surfaces to each other to perform positioning in the two-dimensional direction along the surface perpendicular to the axis of the tapers. However, because the convex and concave tapers themselves have errors in dimension and shape, in order to make the taper surfaces to surely abut, there needs to be a clearance between the top surface of the convex taper (a flat surface on the top of the taper) and the bottom surface of the concave taper.

However, the clearance causes an error in thickness and burrs to the molded items. Therefore, in the positioning of the molding metal mold, it was prioritized to ensure that the top surface of the convex taper and the bottom surface of the concave taper abut to each other, to provide a design in which a clearance exists between the taper surfaces. However, the clearance led to a further problem of causing a positioning error.

In light of such a background, the present invention aims to provide a molding metal mold capable of producing a molded item having a highly precise shape by accurately positioning the separate metal molds.

SUMMARY OF THE INVENTION

To solve the above-described problem, the present invention provides a molding metal mold for forming a cavity between a first metal mold and a second metal mold and for molding a molded item in the cavity, wherein:

the first metal mold comprises a first convex taper tapering toward the second metal mold;

the second metal mold comprises a first concave taper fittable to the first convex taper; and the first convex taper and the first concave taper are formed so that, when fitted to each other, respective taper surfaces abut to each other first, and then a clamping force of the first and second metal molds causes an abutting between respective parting surfaces of the first and second metal molds around the cavity.

Thus, according to the present invention, the first convex taper and the first concave taper for positioning the first and second metal molds are fitted to abut not only by the respective taper surfaces but also by the parting surfaces around the cavity by means of the clamping force. Therefore, not only two-dimensional positions along the surface perpendicular to the axis of the first convex taper and the first concave taper, but positions in the axial direction are also accurately determined. As a result, the cavity has an accurate shape after the molds are clamped, allowing production of a molded item with a highly accurate shape.

In the aforementioned molding metal mold, the first metal mold comprises a first insert having at least a portion of a surface of the cavity, and a first body member surrounding the first insert;

the first insert has a second convex taper, and the first body member has a second concave taper fittable to the second convex taper; and the second convex taper and the second concave taper, when fitted to each other, abut to each other first by respective taper surfaces, and then by respective surfaces perpendicular to an axis of the second convex taper and the second concave taper by a predetermined pressing force pressing the first insert and the first body member to each other.

In this manner, by forming at least one portion of the surface of the cavity by the first insert, it becomes possible to form an acute corner in the cavity, modify the shape of the molded item by changing the first insert, and periodically remove the first insert for maintenance, for example.

The first metal mold is formed by the first insert and the first body member separated from each other, and the first insert is located inside and coaxially with the first convex taper. Thus, in the first body member, the first convex taper and a hole to insert the first insert can be processed in one chuck processing, and can have an accurate positional relationship to each other. Accordingly, the cavity can have a shape as designed, thus allowing it to mold an item with a high precision.

Further, in the above-mentioned molding metal mold, the second metal mold comprises a second insert having at least a portion of the surface of the cavity, and a second body member surrounding the second insert;

the second insert has a second convex taper, and the second body member has a second concave taper fittable to the second convex taper; and the second convex taper and the second concave taper, when fitted to each other, abut to each other second by respective taper surfaces, and then by respective surfaces perpendicular to an axis of the second convex taper and the second concave taper by a predetermined pressing force pressing the second insert and the second body member to each other.

Thus, by forming at least a portion of the surface of the cavity by the second insert, it becomes possible to form an acute corner in the cavity, modify the shape of the molded item by changing the second insert, and periodically remove the second insert for maintenance, for example.

The second metal mold is formed by the second insert and the second body member separated from each other, and the second insert is located inside and coaxially with the second concave taper. Thus, in the second body member, the second concave taper and a hole to insert the second insert can be processed in one chuck processing, and can have an accurate positional relationship to each other. Accordingly, the cavity can have a shape as designed, thus allowing it to mold an item with a high precision.

The above described molding metal mold can be used to produce a molded item by means of a method including:

fitting and closing the first and second metal molds, with a resulting clamping force causing an abutting between respective parting surfaces of the first and second metal molds;

injecting a material into the cavity;

opening the first and second metal molds; and removing the molded item from the cavity.

According to the present invention, the first and second metal molds are accurately positioned, so that it becomes possible to produce a molded item having a highly accurate shape.

DETAILED DESCRIPTION OF THE INVENTION

First Embodiment

Referring to the drawings, an embodiment of the present invention will be described in detail.

Figure 1:
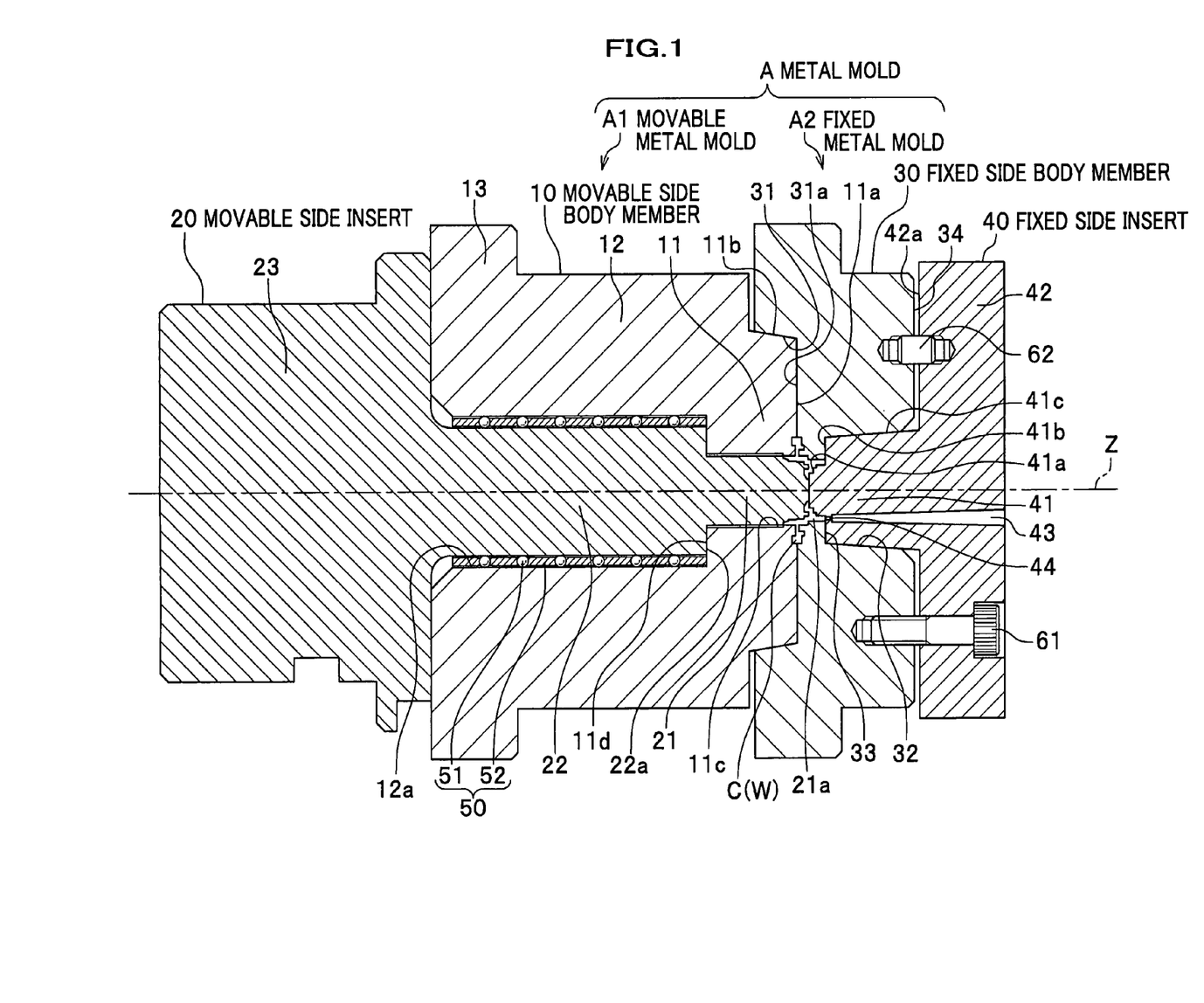
FIG. 1 is a sectional view of a molding metal mold according to a first embodiment of the present invention.
Figure 2:
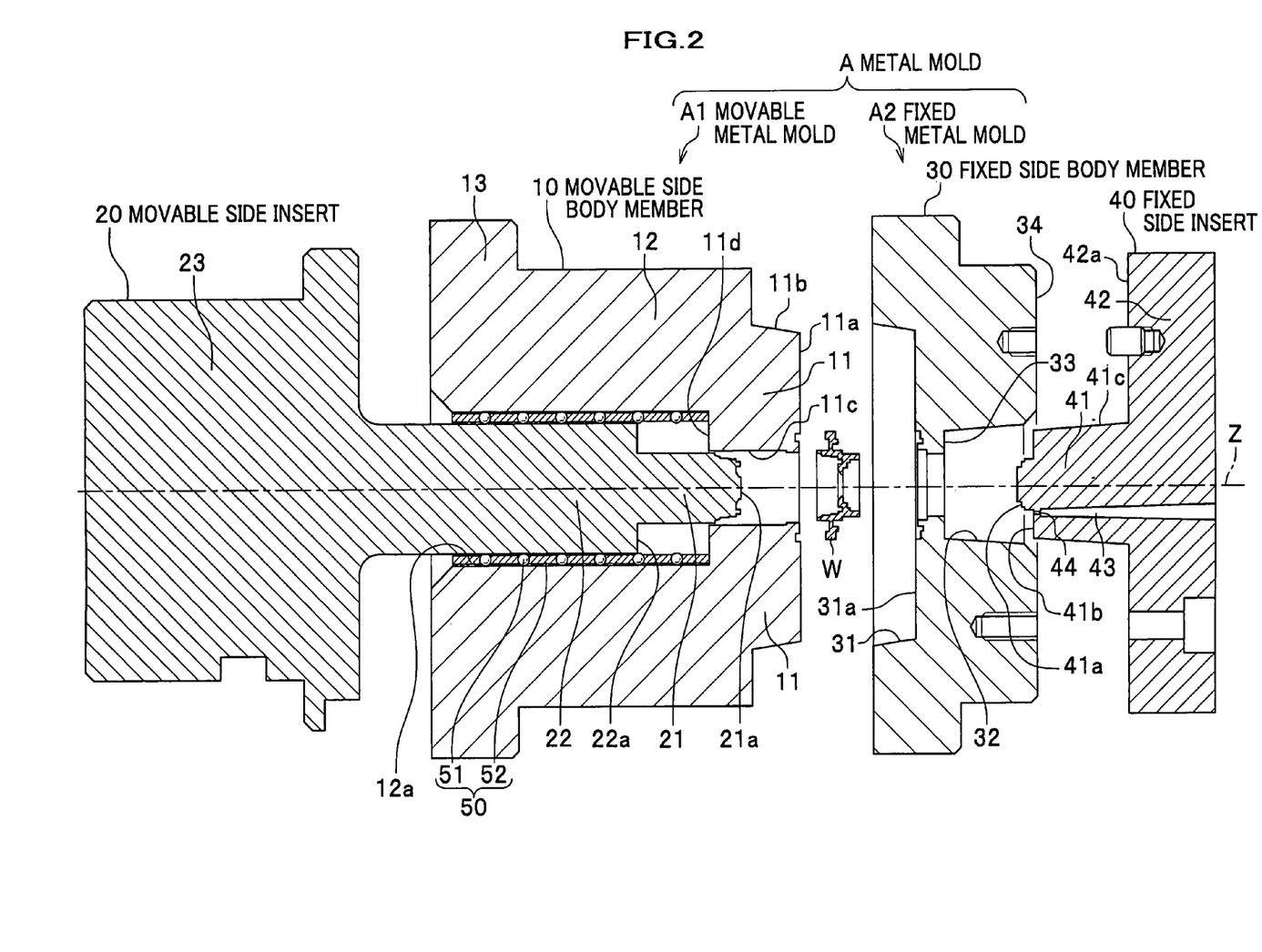
FIG. 2 is a disassembled sectional view of the molding metal mold of FIG. 1.

As shown in FIGS. 1 and 2, a molding metal mold A according to a first embodiment comprises a movable metal mold A1 as a first mold, and a fixed metal mold A2 as a second metal mold. The molding metal mold A is a mold for injection molding a tubular molded item W, for example, but is not limited thereto. The molding metal mold A of the invention can be preferably used particularly for producing molded items requiring high precision of shape wherein the mutual positional relationship between the movable metal mold A1 and the fixed metal mold A2 is considered especially important, such as an optical lens and an optical part such as a mirror frame for supporting the optical lens.

The movable metal mold A1 comprises a movable-side body member 10 as a first body member and a movable-side insert 20 as a first insert. The fixed metal mold A2 comprises a fixed-side body member 30 as a second body member and a fixed-side insert 40 as a second insert.

The movable metal mold A1 is moved along a central axis Z shown in FIG. 1 by a drive unit for an injection molding apparatus (not shown) to abut with and separate from the fixed metal mold A2.

The movable-side insert 20 includes: a cavity forming portion 21 having at the tip end (the side directed to the fixed metal mold 21) a portion of a surface of a cavity C for forming a molded item W; a columnar center shaft portion 22 continuous with the rear side (the opposite side of the fixed metal mold A2) of, and thicker than the cavity forming portion 21; and an attachment portion 23 continuous with the rear side of the center shaft portion 22 and for attaching the movable-side insert 20 to the injection molding apparatus (not shown). At the border between the center shaft portion 22 and the cavity forming portion 21, an abutting surface 22a perpendicular to the center axis Z is provided.

The movable-side body member 10 includes: a parting surface forming portion 11 having a columnar hollow portion for housing the cavity forming portion 21 of the movable-side insert 20; a slide guiding portion 12 continuous with the rear portion of the parting surface forming portion 11, and having a guiding hole 12a with a columnar hollow shape for housing the center shaft portion 22; and an attaching portion 13 for attaching the movable-side body member 10 to the injection molding apparatus (not shown).

Between the slide guiding portion 12 and the center shaft portion 22, a linear bearing 50 is provided having a ball retainer 52 and a plurality of ball bearings 51 held in the ball retainer 52. The ball bearings 51 each have a diameter slightly larger than the clearance between the guiding hole 12a of the slide guiding portion 12 and the center shaft portion 22. That is, the ball bearing 51 allows a sliding movement between the slide guiding portion 12 and the center shaft portion 22 while eliminating backlash therebetween.

The parting surface forming portion 11 has a fitting hole 11c into which the cavity forming portion 21 can be fitted. Opposite to the fixed metal mold A2 of the parting surface forming portion 11 is an end surface 11a which is a flat surface perpendicular to the center axis Z and is a parting surface between the movable metal mold A1 and the fixed metal mold A2. The parting surface forming portion 11 is coaxial with the movable-side insert 20, and has a first convex taper 11b tapering toward the fixed metal mold A2.

At the border between the parting surface forming portion 11 and the slide guiding portion 12 (between the fitting hole 11c and the guiding hole 12a), there exists a step having a surface provided on a plane perpendicular to the center axis Z. The surface of the step is denoted as a positioning surface 11d.

Between the parting surface forming portion 11 and the cavity forming portion 21, a clearance ranging from several to ten and several micrometers is provided for preventing ingression of melted resin.

The fixed-side insert 40 includes: a cavity forming portion 41 having, at the tip end (the side directed toward the movable metal mold A1), a part of the surface of the cavity C for forming the molded item W; and an attaching portion 42 continuous to the rear side (opposite side of the movable metal mold A1) of the cavity forming portion 41.

The cavity forming portion 41 has, in the periphery of a cavity surface 41a, a top surface 41b perpendicular to the center axis Z. The circumference of the cavity forming portion 41 is a third convex taper 41c tapering toward the movable metal mold A1.

The attaching portion 42 has a flat surface (denoted as an assemblage surface 42a) on the side facing the fixed side body member 30.

The fixed-side body member 30 has a third concave taper 32 fitting with the third convex taper 41c and housing the cavity forming portion 41. The third concave taper 32 has a bottom surface 33 facing the top surface 41b. On a surface of the fixed-side body member 30 opposed to the movable metal mold A1, a first concave taper 31 fitting with the first convex taper 11b is formed. The first concave taper 31 has a bottom surface 31a perpendicular to the center axis Z, which is provided to abut, by a clamping force, with the end surface 11a of the first convex taper 11b. The side of the fixed-side body member 30 facing the fixed-side insert 40 is a flat surface (denoted as a rear end surface 34) opposed to the assemblage surface 42a. The bottom surface 31a is a parting surface on the side of the fixed metal mold A2.

To the fixed-side insert 40, a sprue hole 43 and a gate hole 44 are provided each as a path for supplying the melting material from the injection molding apparatus (not shown) to the cavity C.

The fixed-side insert 40 and the fixed-side body member 30 are integrated by means of the third convex taper 41c and the third concave taper 32 fitted to each other and fastened with a plurality of bolts 61 (only one is shown). To adjust and synchronize the phase around the center axis Z between the fixed-side insert 40 and the fixed-side body member 30, at least one knock pin 62 may be used.

When fitted to each other, the third convex taper 41c and the third concave taper 32 abut to each other before the top surface 41b abuts with the bottom surface 33. Also, the clamping force of the bolt 61 causes slight elastic deformation of the fixed-side body member 30 and the fixed-side insert 40, so that the top surface 41b abuts with the bottom surface 33. In other words, mutual positional relationships between the top surface 41b and the third convex taper 41c, and between the third concave taper 32 and the bottom surface 33 are set in such a manner. It should be noted that the elastic deformation mainly occurs at the fixed-side body member 30, with the third concave taper 32 outwardly expanding.

Even when the top surface 41b is in contact with the bottom surface 33, there remains a slight clearance between the rear end surface 34 and the assemblage surface 42a.

The first convex taper 11b and the first concave taper 31 also have the same relationship as the third convex taper 41c and the third concave taper 32. That is, when the movable metal mold A1 is pressed against the fixed metal mold A2 by the injection molding apparatus, firstly the first convex taper 11b abut with the first concave taper 31. Then, clamping force of the movable metal mold A1 and the fixed metal mold A2 causes slight elastic deformation of the movable-side body member 10 and the fixed-side body member 30, resulting in an abutting between the end surface 11a of the first convex taper 11b and the bottom surface 31a of the first concave taper 31.

Next, an effect of the molding metal mold A thus constructed will be described.

To use the molding metal mold A, the third convex taper 41c of the fixed-side insert 40 is fitted into the third concave taper 32 of the fixed-side body member 30. Then, the third convex taper 41c and the third concave taper 32 are mutually aligned with the knock pin 62, and fastened with the bolts 61. In this assembly operation, the third convex taper 41c abuts with the third concave taper 32 first, before the top surface 41b abuts with the bottom surface 33 by the clamping force of the bolts 61. Thus, the position of the cavity surface 41a at the cavity forming portion 41 with respect to the first concave taper 31 is accurately determined. In other words, the abutting between the top surface 41b and the bottom surface 33 accurately determines positions in the direction of the center axis Z. The abutting between the third concave taper 32 and the third convex taper 41c determines positions in the direction perpendicular to the center axis Z. Further, the knock pin 62 accurately determines positions around the center axis Z.

Also for the movable metal mold A1, the movable-side insert 20 is inserted into the movable-side body member 10. Here, the slide guiding portion 12 and the center shaft portion 22 are assembled slidably in the direction of the center axis Z by the linear bearing 50 provided therebetween, without any backlash in the direction perpendicular to the center axis Z. Further, the abutting between the abutting surface 22a and the positioning surface 11d determines the mutual positional relationship between the first convex taper 11b and a cavity surface 21a of the movable-side insert 20.

The movable metal mold A1 and the fixed metal mold A2 are attached to the injection molding apparatus, and the movable metal mold A1 is moved to fit with the fixed metal mold A2 to close the mold.

Figure 3A:
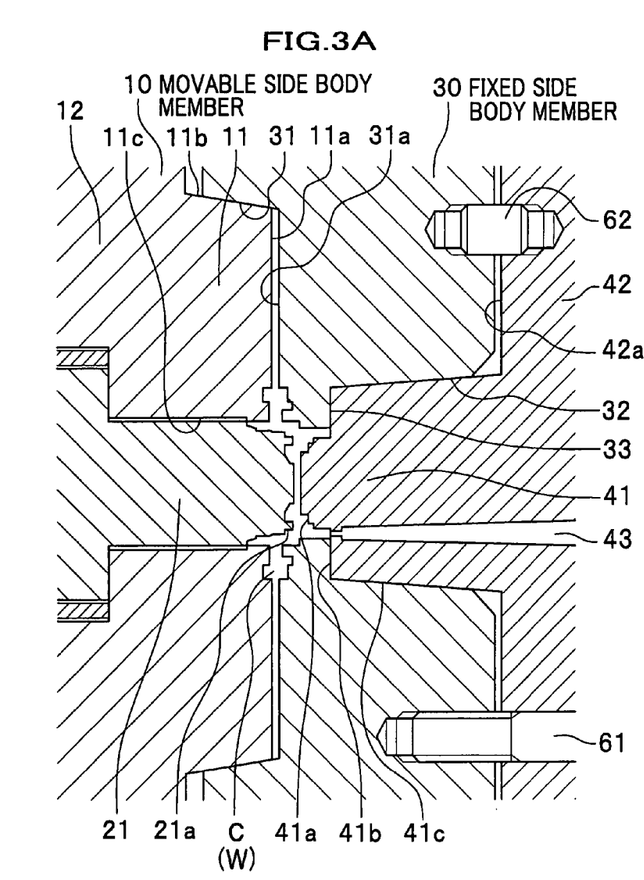
FIG. 3A is an expanded sectional view of the molding metal mold of FIG. 1, wherein the mold is closed.
Figure 3B:
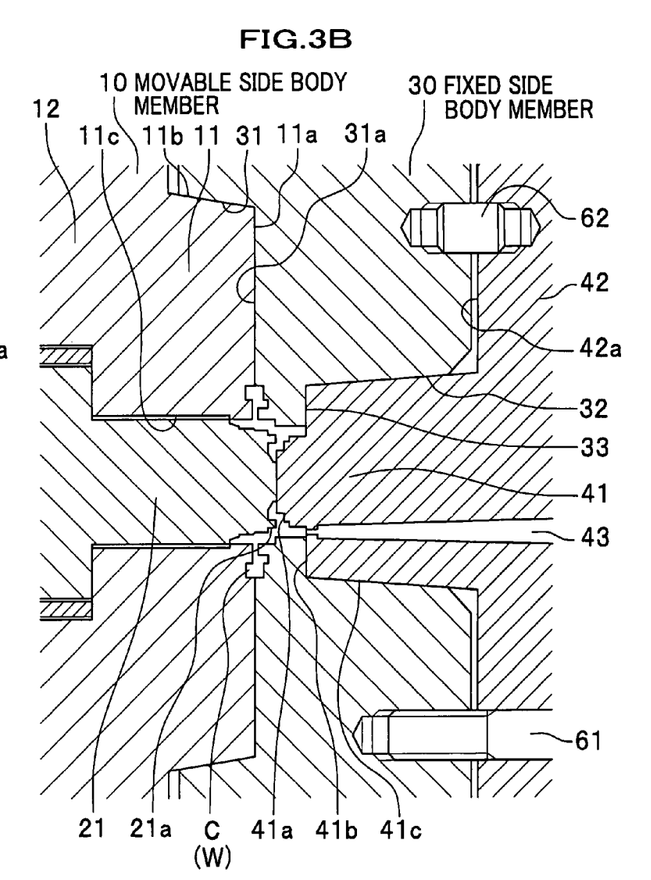
FIG. 3B is an expanded sectional view of the molding metal mold of FIG. 1, wherein a clamping force is applied to the mold.

At this time, the first convex taper 11b and the first concave taper 31 abut first, as shown in the expanded sectional view of FIG. 3A. Thereafter, the clamping force mainly causes the fixed-side body member 30 to elastically deform in an outwardly expanding manner, pressing the first convex taper 11b into the first concave taper 31, thus causing the end surface 11a of the first convex taper 11b to abut with the bottom surface 31a of the first concave taper 31. As a result, positions of the movable metal mold A1 and the fixed metal mold A2 are accurately determined in the direction of the center axis Z. Thereby, relative positions of the movable metal mold A1 and the fixed metal mold A2 are also accurately determined including positions in the direction perpendicular to the center axis Z. Therefore, relative positions of the cavity surface 21a on the side of the movable metal mold A1 and the cavity surface 41a on the side of the fixed metal mold A2 can be accurately determined.

Next, a material, e.g., melted resin, is injected from the sprue hole 43 into the cavity C. After the melted resin cools down to solidifies, the mold is opened to remove the molded item W.

As described above, the molding metal mold A of the present embodiment provides the cavity C with an accurate shape as designed, and as a result, can be preferably applied to produce a molded item W requiring a high precision such as a lens, mirror frame and lens-barrel.

Second Embodiment

Figure 4:
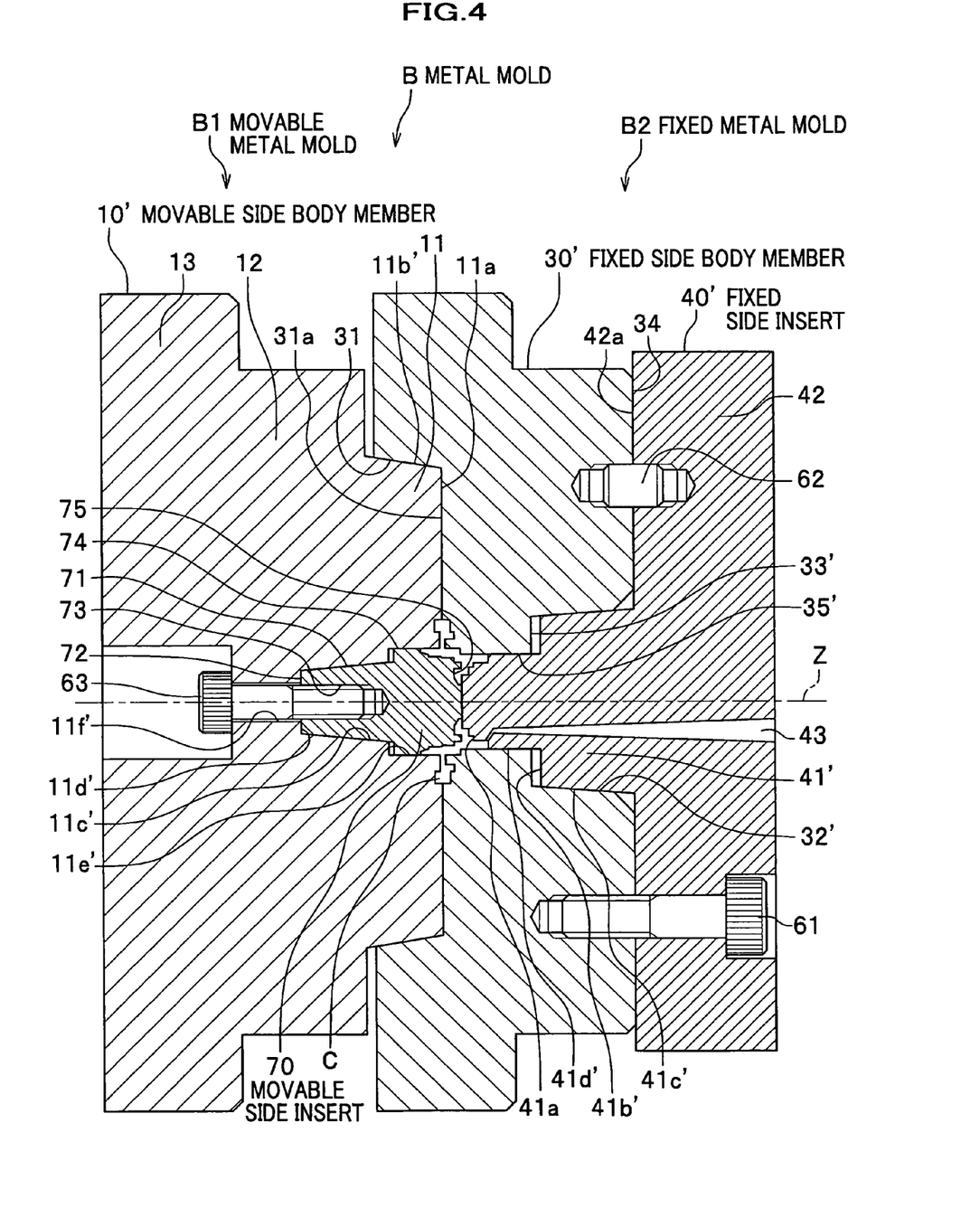
FIG. 4 is a sectional view of a molding metal mold according to a second embodiment of the present invention.

Next, as a modification of the first embodiment, a second embodiment of the present invention will be discussed with reference to FIG. 4. FIG. 4 is a sectional view of a molding metal mold according to the second embodiment. The same portions as the first embodiment are denoted with the same symbols and descriptions thereof will be omitted.

As shown in FIG. 4, the molding metal mold B according to the second embodiment comprises a movable metal mold B1 and a fixed metal mold B2.

The movable metal mold B1 comprises a movable-side body member 10' and a movable-side insert 70. In the molding metal mold A of the first embodiment, the movable-side body member 10 and the movable-side insert 20 are assembled in a mutually slidable (movable) manner while being relatively positioned by means of the linear bearing 50. In contrast, in the movable metal mold B1, mutual positioning between the movable-side body member 10' and the movable-side insert 70 is carried out by means of a taper. That is, the movable-side body member 10' has a second concave taper 11c' along a center axis Z (coaxially with the first convex taper 11b'). The movable-side insert 70 has, on the outer circumference thereof, a second convex taper 71 fitting with the second concave taper 11c'. The second concave taper 11c' has a bottom portion 11d' formed as plain surface perpendicular to the center axis Z. The second concave taper 11c' also has, at the end thereof (on the side of a fixed-side body member 30'), a hole portion 11e' opening toward a cavity C, having a circular cross section of a larger diameter than the second concave taper 11c'. Further, the bottom portion 11d' has at the center a through hole 11f'.

The movable-side insert 70 has, at the rear end side of the second convex taper 71 (opposite side of the fixed-side body member 30'), an abutting surface 72 having a flat surface perpendicular to an axis of the second convex taper 71. On the abutting surface 72, a screw hole 73 is provided. The second convex taper 71 has, on the end side thereof, a shaft portion 74 having a circular cross section with a diameter larger than the second convex taper 71. The shaft portion 74 can fit with a hole portion 11e', and a clearance (preferably ranging from several to ten and several micrometers) is provided therebetween.

When the movable-side body member 10' and the movable-side insert 70 are fitted to each other, the second convex taper 71 and the second concave taper 11c' fit to each other first. Then, by inserting a bolt 63 into the through hole 11f' and then screwing and fastening the bolt 63 into the screw hole 73, the movable-side body member 10' and the movable-side insert 70 are pressed to each other. The pressing force causes elastic deformation in the vicinity of the second concave taper 11c' and second convex taper 71, thus leading to the abutting between the bottom portion 11d' and the abutting surface 72.

In this manner, positions in the direction of the center axis Z of the movable-side body member 10' and the movable-side insert 70, and positions perpendicular to the center axis Z are both accurately positioned. Thus, the mutual positional relationship between the first convex taper 11b' and a cavity surface 75 of the movable-side insert 70 becomes accurate.

A fixed metal mold B2 comprises a fixed-side body member 30' and a fixed-side insert 40'.

Like the fixed-side body member 30 in the first embodiment, the fixed-side body member 30' has a third concave taper 32' along the center axis Z (coaxial with the first concave taper 31). The third concave taper 32' has a bottom surface 33' comprising a flat surface perpendicular to the center axis Z. At the center of the bottom surface 33', a hole portion 35' is provided having a columnar hollow shape linked to the cavity C.

The fixed-side body member 30' has a rear end surface 34 comprising a flat surface perpendicular to the central axis Z.

The fixed-side insert 40' comprises: a cavity forming portion 41' having, at the tip end thereof, a portion of the surface of the cavity C for forming the molded item W; and an attaching portion 42 linked to the rear side (opposite side of the movable metal mold B1) of the cavity forming portion 41'.

The cavity forming portion 41' has, on the rear end side of a cavity surface 41a, a shaft portion 41d' having a columnar shape along the center axis Z. The cavity forming portion 41' has a third convex taper 41c' tapering toward the end side thereof and having a circumference fitting with the third concave taper 32'. The third convex taper 41c' and the shaft portion 41d' are connected in a step surface 41b' perpendicular to the center axis Z.

To make the fixed-side body member 30' and the fixed-side insert 40' to fit to each other, the third concave taper 32' and the third convex taper 41c' are fitted to each other while determining the phase around the center axis Z by means of a knock pin 62. At this time, surfaces of the tapers abut to each other first, to determine mutual positions in the direction perpendicular to the center axis Z of the fixed-side body member 30' and the fixed-side insert 40'. Then, the fixed-side body member 30' and the fixed-side insert 40' are fastened to each other by means of a bolt 61, with a resultant pressing force occurring therebetween causing elastic deformation and expansion in the periphery of mainly the third concave taper 32', which press the third convex taper 41c' into the third concave taper 32'. This results in abutting between the rear end surface 34 of the fixed-side body member 30' and an assemblage surface 42a of the fixed-side insert 40'. In this manner, positions of the fixed-side body member 30' and the fixed-side insert 40' in the direction of the center axis Z are determined. It is to be noted that, at this time, there remains a clearance between the bottom surface 33' and the step surface 41b'.

Because the fixed-side body member 30' and the fixed-side insert 40' thus assembled are accurately positioned to each other, the positional relationship between the first concave taper 31 and the cavity surface 41a of the fixed-side insert 40' becomes accurate.

The molding metal mold B as described above can also accurately form the cavity C as designed, by fitting the first convex taper 11b and the first concave taper 31, and abutting an end surface 11a and a bottom surface 31a (i.e., parting surface) by means of a clamping force. Therefore, by injecting resin into the cavity C, the molded item W having an accurate shape can be produced.

Although an embodiment of the present invention has been described heretofore, the invention is not limited to the aforedescribed embodiments but may be modified accordingly.

For example, in the above-mentioned molding metal mold, although the outside portion of the concave taper is mainly constructed to elastically deform, the (first to third) convex tapers may be constructed to more easily have an elastic deformation.

Figure 5A:
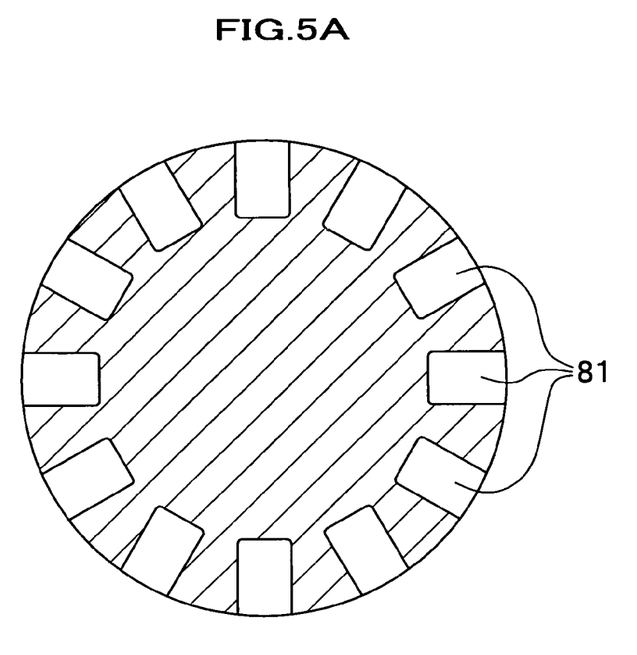
FIG. 5A is a sectional view of a convex taper of a molding metal mold according to a modified example.
Figure 5B:
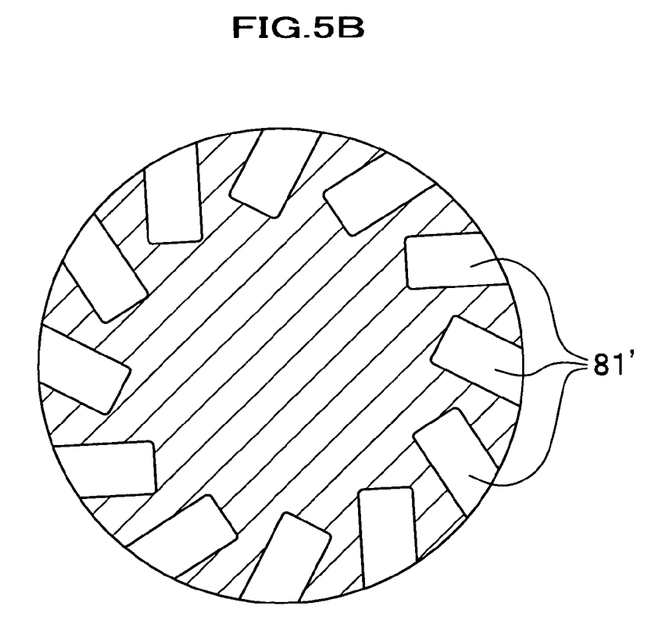
FIG. 5B is a sectional view of a convex taper of a molding metal mold according to a modified example.

For example, the convex tapers can easily have elastic deformation by having a plurality of grooves 81 on the circumference of the tapers, as shown in FIG. 5A. Also, as shown in FIG. 5B, the convex tapers can more easily have elastic deformation by having grooves 81' provided by slanting the grooves 81 with respect to the circumferential surface of the tapers. Similarly, in the case of the concave tapers, by providing grooves as needed on the taper surface for easy elastic deformation, freedom in mold design can be increased.

Further, although constructed for easy detachment in the present embodiments, the body members and the inserts may have an integrated construction instead of using the inserting construction, or the inserts may be pressed or shrinkage-fitted into the body member, if no detachment is required.

Still further, although examples are taken for injection molding a resin in the embodiments, the material to be molded is not limited to a resin, but may be ceramic or powdered metal dispersed in a solvent. The present invention may also be applied to a metal mold for compression molding instead of injection molding.

What is claimed is:

1. A molding metal mold for forming a cavity between a first metal mold and a second metal mold and for molding a molded item in the cavity, wherein:
    the first metal mold comprises a first convex taper tapering toward the second metal mold;
    the second metal mold comprises a first concave taper fittable to the first convex taper; and
    the first convex taper and the first concave taper are formed so that, when fitted to each other, respective taper surfaces abut to each other first, and then a clamping force of the first and second metal molds causes an elastic deformation of at least one of the first metal mold and the second metal mold so as to cause an abutting between respective parting surfaces of the first and second metal molds around the cavity.

2. A molding metal mold as claimed in claim 1, wherein:
    the first metal mold comprises a first insert having at least a portion of a surface of the cavity, and a first body member surrounding the first insert;
    the first insert has a second convex taper, and the first body member has a second concave taper fittable to the second convex taper; and the second convex taper and the second concave taper, when fitted to each other, abut to each other first by respective taper surfaces, and then by respective surfaces perpendicular to an axis of the second convex taper and the second concave taper by a predetermined pressing force pressing the first insert and the first body member to each other.

3. A molding metal mold as claimed in claim 2, wherein a cavity surface of the first insert is positioned inside the first convex taper, and the center of gravity of the first insert is located on the axis of the first convex taper.

4. A molding metal mold as claimed in claim 2, wherein:
the molding metal mold further comprises at least one bolt for fastening the first insert and the first body member; and
the predetermined pressing force includes a fastening force of the at least one bolt.

5. A molding metal mold as claimed in claim 2, wherein the molding metal mold further comprises at least one knock pin provided between the first insert and the first body member, the knock pin adjusting a phase around a center axis of the first insert and the first body member.

6. A molding metal mold as claimed in claim 1, wherein:
the second metal mold comprises a second insert having at least a portion of the surface of the cavity, and a second body member surrounding the second insert;
the second insert has a third convex taper, and the second body member has a third concave taper fittable to the third convex taper; and
the third convex taper and the third concave taper, when fitted to each other, abut to each other first by respective taper surfaces, and then by respective surfaces perpendicular to an axis of the third convex taper and the third concave taper by a predetermined pressing force pressing the second insert and the second body member to each other.

7. A molding metal mold as claimed in claim 6, wherein the cavity surface of the second insert is positioned inside the first concave taper, and the center of gravity of the second insert is located on the axis of the first concave taper.

8. A molding metal mold as claimed in claim 6, wherein
the molding metal mold further comprises at least one bolt for fastening the second insert and the second body member, and
the predetermined pressing force includes a fastening force of the at least one bolt.

9. A molding metal mold as claimed in claim 6, wherein the molding metal mold further comprises at least one knock pin provided between the second insert and the second body member, the knock pin adjusting a phase around a center axis of the second insert and the second body member.

10. A molding metal mold as claimed in claim 2, wherein:
the second metal mold comprises a second insert having at least a portion of the surface of the cavity, and a second body member surrounding the second insert;
the second insert has a third convex taper, and the second body member has a third concave taper fittable to the second convex taper; and
the third convex taper and the third concave taper, when fitted to each other, abut to each other first by respective taper surfaces, and then by respective surfaces perpendicular to an axis of the third convex taper and the third concave taper by a predetermined pressing force pressing the second insert and the second body member to each other.

11. A molding metal mold as claimed in claim 10, wherein the cavity surface of the first insert is positioned inside the first convex taper, and the center of gravity of the first insert is located on the axis of the first convex taper.

12. A molding metal mold as claimed in claim 10, wherein:
the molding metal mold further comprises at least one bolt for fastening the first insert and the first body member; and
the predetermined pressing force includes a fastening force of the at least one bolt.

13. A molding metal mold as claimed in claim 10, wherein the molding metal mold further comprises at least one knock pin provided between the first insert and the first body member, the knock pin adjusting a phase around a center axis of the first insert and the first body member.

14. A molding metal mold as claimed in claim 10, wherein the cavity surface of the second insert is positioned inside the first concave taper, and the center of gravity of the second insert is located on the axis of the first concave taper.

15. A molding metal mold as claimed in claim 10, wherein:
the molding metal mold further comprises at least one bolt for fastening the second insert and the second body member; and
the predetermined pressing force includes a fastening force of the at least one bolt.

16. A molding metal mold as claimed in claim 10, wherein the molding metal mold further comprises at least one knock pin provided between the second insert and the second body member, the knock pin adjusting a phase around a center axis of the second insert and the second body member.

17. A molding metal mold as claimed in claim 1, wherein at least one of the convex taper and the concave taper has a plurality of grooves formed therein.

18. A molding metal mold as claimed in claim 17, wherein the plurality of grooves are slantingly formed with respect to the diametrical direction of the taper.

19. A method of producing a molded item, including:
using the molding metal mold as claimed in claim 1 to fit and close the first and second metal molds, with a resulting clamping force causing an abutting between respective parting surfaces of the first and second metal molds;
injecting a material into the cavity;
opening the first and second metal molds; and
removing the molded item from the cavity.

* * * * *